United States Patent
Ashida (10) Patent No.: US 11,391,284 B2
(45) Date of Patent: Jul. 19, 2022

(54) VACUUM PUMPING DEVICE AND VACUUM PUMPING DEVICE STARTING METHOD

(71) Applicant: SHIMADZU CORPORATION, Kyoto (JP)

(72) Inventor: Osamu Ashida, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 127 days.

(21) Appl. No.: 17/066,116

(22) Filed: Oct. 8, 2020

(65) Prior Publication Data
US 2021/0115933 A1    Apr. 22, 2021

(30) Foreign Application Priority Data
Oct. 18, 2019 (JP) .............................. JP2019-191225

(51) Int. Cl.
*F04D 19/04* (2006.01)
*F04D 27/02* (2006.01)

(52) U.S. Cl.
CPC ......... *F04D 19/042* (2013.01); *F04D 19/046* (2013.01); *F04D 27/0261* (2013.01); *Y02B 30/70* (2013.01)

(58) Field of Classification Search
CPC ...... F04D 19/04; F04D 19/042; F04D 19/046; F04D 27/0261; F04D 27/0004; F04D 27/0284; F04D 27/0292; F04B 37/14; F04B 41/06; F04B 49/02; F04B 49/022; F04B 49/06; F04B 2207/043; F04C 2220/10; F04C 2220/12; F04C 23/006; F04C 28/08
See application file for complete search history.

(56) References Cited

U.S. PATENT DOCUMENTS

| | | | | | |
|---|---|---|---|---|---|
| 4,699,570 | A | * | 10/1987 | Bohn | ...................... F04C 28/02 417/69 |
| 4,887,941 | A | * | 12/1989 | Crinquette | .............. F04B 37/14 417/205 |
| 5,039,280 | A | * | 8/1991 | Saulgeot | ............... F04B 49/022 417/205 |
| 5,165,864 | A | * | 11/1992 | Burger | ................ F04D 27/0269 417/244 |

(Continued)

FOREIGN PATENT DOCUMENTS

JP  2019-044746 A  3/2019
WO  WO 2004/090332 A1  * 10/2004

*Primary Examiner* — Charles G Freay
(74) *Attorney, Agent, or Firm* — Renner, Otto, Boisselle & Sklar, LLP (57) ABSTRACT

A vacuum pumping device comprises: a turbo-molecular pump; an backing pump connected to an outlet side of the turbo-molecular pump; a measurement section configured to measure first elapsed time until a suction-port-side pressure of the backing pump reaches a predetermined pressure higher than a turbo-molecular pump startable pressure and lower than an atmospheric pressure after start of the backing pump; an arithmetic section configured to calculate, based on the first elapsed time measured by the measurement section, the atmospheric pressure, and the predetermined pressure, second elapsed time until the suction-port-side pressure reaches the turbo-molecular pump startable pressure after the start of the backing pump; and a start control section configured to start the turbo-molecular pump when the second elapsed time has elapsed after the start of the backing pump.

7 Claims, 6 Drawing Sheets

(56) References Cited

U.S. PATENT DOCUMENTS

| | | | |
|---|---|---|---|
| 6,419,455 B1 * | 7/2002 | Rousseau | F04D 27/0261 |
| | | | 417/244 |
| 7,789,632 B2 * | 9/2010 | Rival | F04C 28/02 |
| | | | 417/2 |

* cited by examiner

VACUUM PUMPING DEVICE AND VACUUM PUMPING DEVICE STARTING METHOD

BACKGROUND OF THE INVENTION

1. Technical Field

The present invention relates to a vacuum pumping device and a vacuum pumping device starting method.

2. Background Art

Typically, in a case where a vacuum chamber with an optional volume is pumped to high vacuum or ultrahigh vacuum by a combination of a turbo-molecular pump and its backing pump, a method in which the backing pump is first started and the turbo-molecular pump is started after the pressure of the vacuum chamber has decreased to such a pressure (a range of about 10 to 1000 Pa) that the turbo-molecular pump can be continuously operated has been employed (see, e.g., Patent Literature 1 (JP-A-2019-044746)). In Patent Literature 1, a change in the pressure of the vacuum chamber after the backing pump has been started is estimated, and elapsed time until the estimated pressure reaches the above-described continuously-operable pressure after the start of the backing pump is computed. Then, the turbo-molecular pump is started at such a point that such computed time has elapsed after the backing pump has been actually started.

SUMMARY OF THE INVENTION

In the starting method described in Patent Literature 1, a chamber volume and an pumping speed of a backing necessary for estimation and computation need to be obtained and stored in advance. The vacuum pumping device including the turbo-molecular pump and the backing pump is utilized for pumping of various vacuum chambers, and in the starting method described in Patent Literature 1, the process of checking and storing the chamber volume every time the vacuum chamber is changed needs to be performed. For this reason, a preparation process before the start of the vacuum pumping device takes a lot of trouble, and if the process of storing the chamber volume is failed to be performed, there is a problem that the turbo-molecular pump is not started at proper timing.

A vacuum pumping device comprises: a turbo-molecular pump; an backing pump connected to an outlet side of the turbo-molecular pump; a measurement section configured to measure first elapsed time until a suction-port-side pressure of the backing pump reaches a predetermined pressure higher than a turbo-molecular pump startable pressure and lower than an atmospheric pressure after start of the backing pump; an arithmetic section configured to calculate, based on the first elapsed time measured by the measurement section, the atmospheric pressure, and the predetermined pressure, second elapsed time until the suction-port-side pressure reaches the turbo-molecular pump startable pressure after the start of the backing pump; and a start control section configured to start the turbo-molecular pump when the second elapsed time has elapsed after the start of the backing pump.

The measurement section includes a pressure gauge configured to measure the suction-port-side pressure of the backing pump or a pressure difference gauge configured to measure a pressure difference between the suction-port-side pressure and the atmospheric pressure, and a time measurement section configured to measure, as the first elapsed time, time until the measurement pressure of the pressure gauge reaches a predetermined pressure higher than the turbo-molecular pump startable pressure after the start of the backing pump or time until the measurement pressure difference of the pressure difference gauge reaches a pressure difference between the predetermined pressure and the atmospheric pressure after the start of the backing pump.

The measurement section includes a pressure switch configured to output a signal informing that a pressure difference between the suction-port-side pressure of the backing pump and the atmospheric pressure has reached a pressure difference between a predetermined pressure higher than the turbo-molecular pump startable pressure and the atmospheric pressure, and a time measurement section configured to measure, as the first elapsed time, time until the signal is outputted from the pressure switch after the start of the backing pump.

A pressure difference between the predetermined pressure and the atmospheric pressure is set to a range of −75 kPa and −95 kPa.

When the first elapsed time is t1, the atmospheric pressure is P0, the predetermined pressure is P1, the turbo-molecular pump startable pressure is P2, and the second elapsed time is t2, t2 is calculated based on the following expression:

$$t2=\{\log_e(P0/P2)/\log_e(P0/P1)\} \times t1.$$

A method for starting a vacuum pumping device including a turbo-molecular pump and a backing pump connected to an outlet side of the turbo-molecular pump, comprising: measuring first elapsed time until a suction-port-side pressure of the backing pump reaches a predetermined pressure higher than a turbo-molecular pump startable pressure and lower than an atmospheric pressure after start of the backing pump; calculating, based on the first elapsed time, the atmospheric pressure, and the predetermined pressure, second elapsed time until the suction-port-side pressure reaches the turbo-molecular pump startable pressure after the start of the backing pump; and starting the turbo-molecular pump when the second elapsed time has elapsed after the start of the backing pump.

According to the present invention, a vacuum pumping device can be provided, which is configured so that a turbo-molecular pump can be properly started without the need for performing the preparation process of storing a chamber volume in advance and excellent operability can be provided.

DETAILED DESCRIPTION OF THE EXEMPLARY EMBODIMENTS

Figure 1:
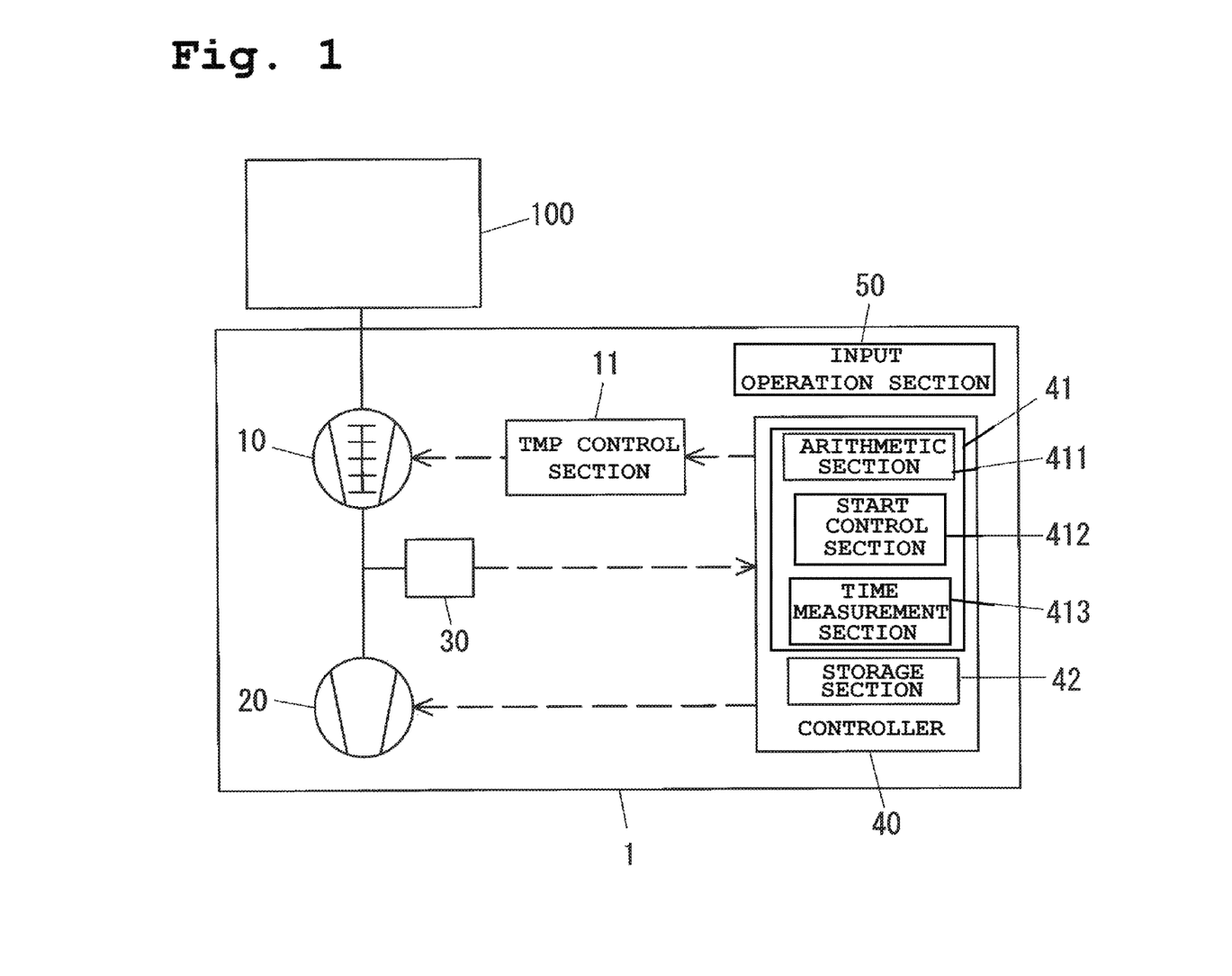
FIG. 1 is a diagram showing an outline configuration of a vacuum pumping device.

Hereinafter, a mode for carrying out the present invention will be described with reference to the drawings. FIG. 1 is a diagram showing an outline configuration of a vacuum pumping device 1. The vacuum pumping device 1 includes a turbo-molecular pump 10 and an backing pump 20 provided on an outlet side of the turbo-molecular pump 10 as an evacuation system. The turbo-molecular pump 10 is connected to a vacuum chamber 100 in which vacuum pumping is performed by the vacuum pumping device 1. The vacuum pumping device 1 further includes a pressure switch 30 configured to detect the suction-port-side pressure of the backing pump 20, a TMP control section 11 configured to drivably control the turbo-molecular pump 10, a controller 40 configured to control the entirety of the vacuum pumping device 1, and an input operation section 50 having, e.g., a switch to be operated by an operator. Although not shown in the figure, the input operation section 50 has, for example, a power switch for performing power ON/OFF operation of the vacuum pumping device 1, a start switch for starting the exhaust system, and a stop switch for stopping the evacuation system.

Start and stop of the turbo-molecular pump 10 and the backing pump 20 are controlled by the controller 40. The controller 40 includes a microcomputer having a CPU 41, a storage section 42 such as a RAM, a ROM or the like. The CPU 41 functions as an arithmetic section 411, a start control section 412, and a time measurement section 413 according to a control program stored in the storage section 42, thereby controlling the TMP control section 11 and the backing pump 20.

The pressure switch 30 measures a difference (a gauge pressure) between the suction-port-side pressure of the backing pump 20 and an atmospheric pressure, outputs an OFF signal or an ON signal in a case where the measured pressure difference is lower than a preset set pressure, and outputs the ON signal or the OFF signal when the pressure difference increases to the set pressure. Hereinafter, a case where the OFF signal is outputted in a case where the pressure difference is lower than the set pressure and the ON signal is outputted when the pressure difference reaches the set pressure will be described by way of example. The start control section 412 controls the start of the turbo-molecular pump 10 based on the output signal of the pressure switch 30.

In the present embodiment, the timing (elapsed time t2) of starting the turbo-molecular pump 10 is estimated and computed based on evacuation time until the suction-port-side pressure P of the backing pump 20 reaches a predetermined pressure P1 after the backing pump 20 has been started, i.e., elapsed time t1 until the suction-port-side pressure P reaches the predetermined pressure P1 after the start of the backing pump 20. The turbo-molecular pump 10 is started at such a point that the time t2 has actually elapsed after the start of the backing pump 20. The suction-port-side pressure of the backing pump 20 as described herein means a pressure at an optional location in an evacuation path from a suction port of the backing pump 20 of FIG. 1 to an inlet of the vacuum chamber 100. That is, the pressure switch 30 can be provided at an optional position in the evacuation path from the suction port of the backing pump 20 to the inlet of the vacuum chamber 100.

In the configuration shown in FIG. 1, the pressure of the evacuation path from the suction port of the auxiliary pump 20 to an outlet port of the turbo-molecular pump 10 is detected by the pressure switch 30. Note that in a state in which the turbo-molecular pump 10 is stopped, the turbo-molecular pump 10 functions only as a mere evacuation path upon pumping of the backing pump 20.

Figure 2:
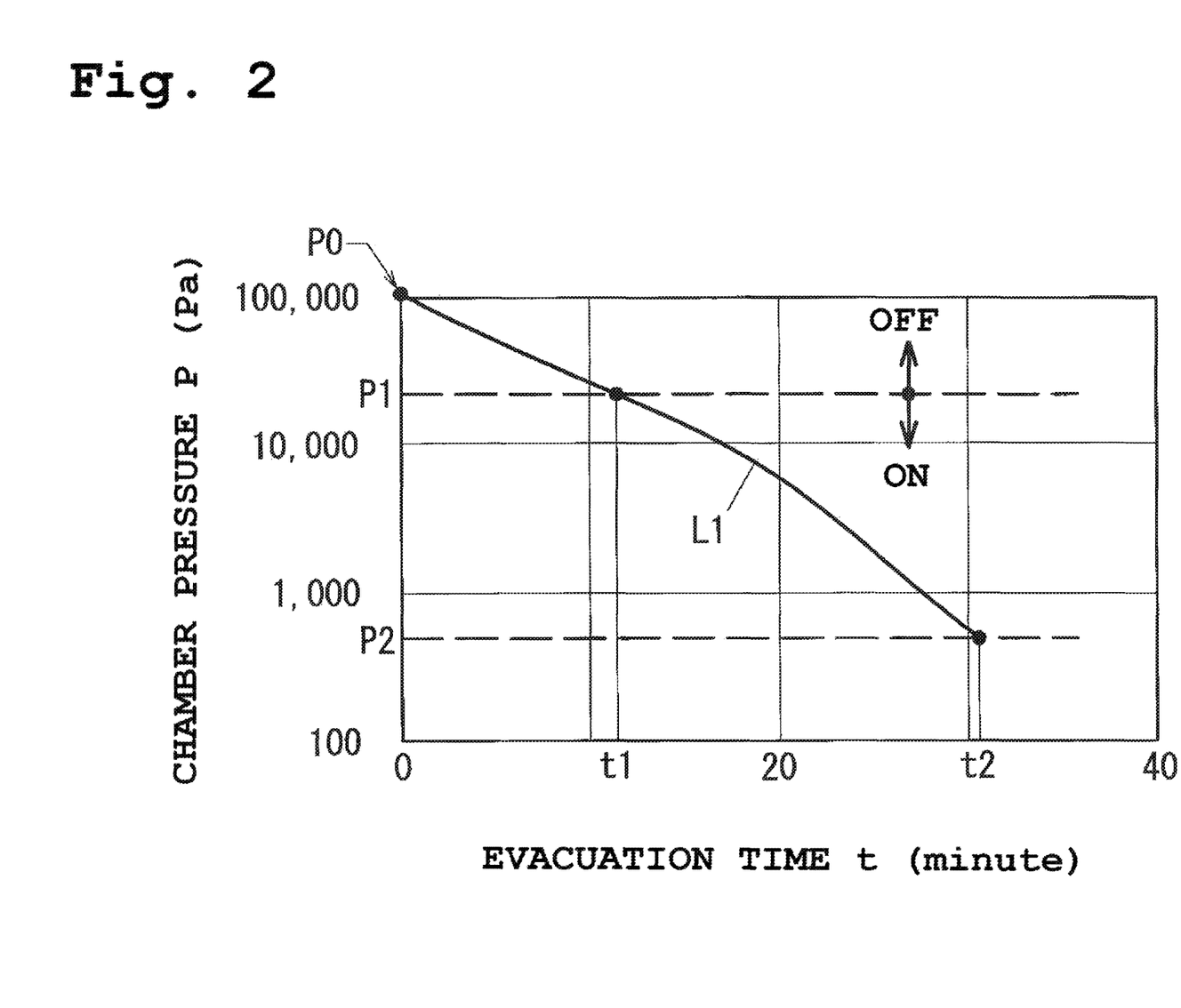
FIG. 2 is a graph showing one example of a change in a chamber pressure after the start of an backing pump.

FIG. 2 shows one example of a change (i.e., a pressure versus time curve) in the pressure of the vacuum chamber 100 after the start of the backing pump in the configuration of FIG. 1. The horizontal axis of FIG. 2 indicates the evacuation time t, and the vertical axis indicates the pressure (the absolute pressure) of the vacuum chamber 100. A pressure versus time curve L1 shows a case where the volume of the vacuum chamber 100 is 1000 (L). The pressure of the vacuum chamber 100 at the start of pumping is an atmospheric pressure P0 ($\approx$100,000 Pa). At t=t1, the predetermined pressure P1 at which the pressure switch 30 is turned on is brought. At t=t2, the startable pressure P2 of the turbo-molecular pump 10 is brought. As described above, a pressure at which the turbo-molecular pump 10 can be continuously operated is lower than the atmospheric pressure P0, and in the present embodiment, such a continuously-operable pressure will be referred to as the "startable pressure P2."

The pressure switch 30 is turned on/off according to the difference (i.e., the gauge pressure) between the suction-port-side pressure P and the atmospheric pressure P0. In a case where the vacuum chamber 100 is vacuum-pumped by the backing pump 20, the pressure P on the backing pump suction port side including the vacuum chamber 100 becomes lower than the atmospheric pressure P0, and therefore, the pressure difference P−P0 (=−|P−P0|<0) as the gauge pressure is a negative value, i.e., a negative pressure. In the example shown in FIG. 2, the set pressure difference of the pressure switch 30 is set to −|P1−P0|. At t=0 to t1, the pressure difference magnitude |P−P0| as the absolute value of the detected pressure difference is less than the set pressure difference magnitude |P1−P0|, and the pressure switch 30 is in an OFF state. At t=t1, when P=P1 is satisfied, |P−P0|=|P1−P0| is satisfied, and the pressure switch 30 is turned on.

Assuming that the pumping speed of the backing pump 20 is S and the chamber volume is V, the evacuation time t from the atmospheric pressure P0 to the pressure P is calculated according to Expression (1) below.

$$t=(V/S)\log_e(P0/P) \qquad (1)$$

Thus, the time t1 (the elapsed time t1) at which the suction-port-side pressure P reaches such a predetermined pressure P1 that the pressure switch 30 is turned on is represented by Expression (2) below, and the time t2 (the elapsed time t2) at which the suction-port-side pressure P reaches the startable pressure P2 of the turbo-molecular pump 10 is represented by Expression (3) below.

$$t1=(V/S)\log_e(P0/P1) \qquad (2)$$

$$t2=(V/S)\log_e(P0/P2) \qquad (3)$$

Figure 3:
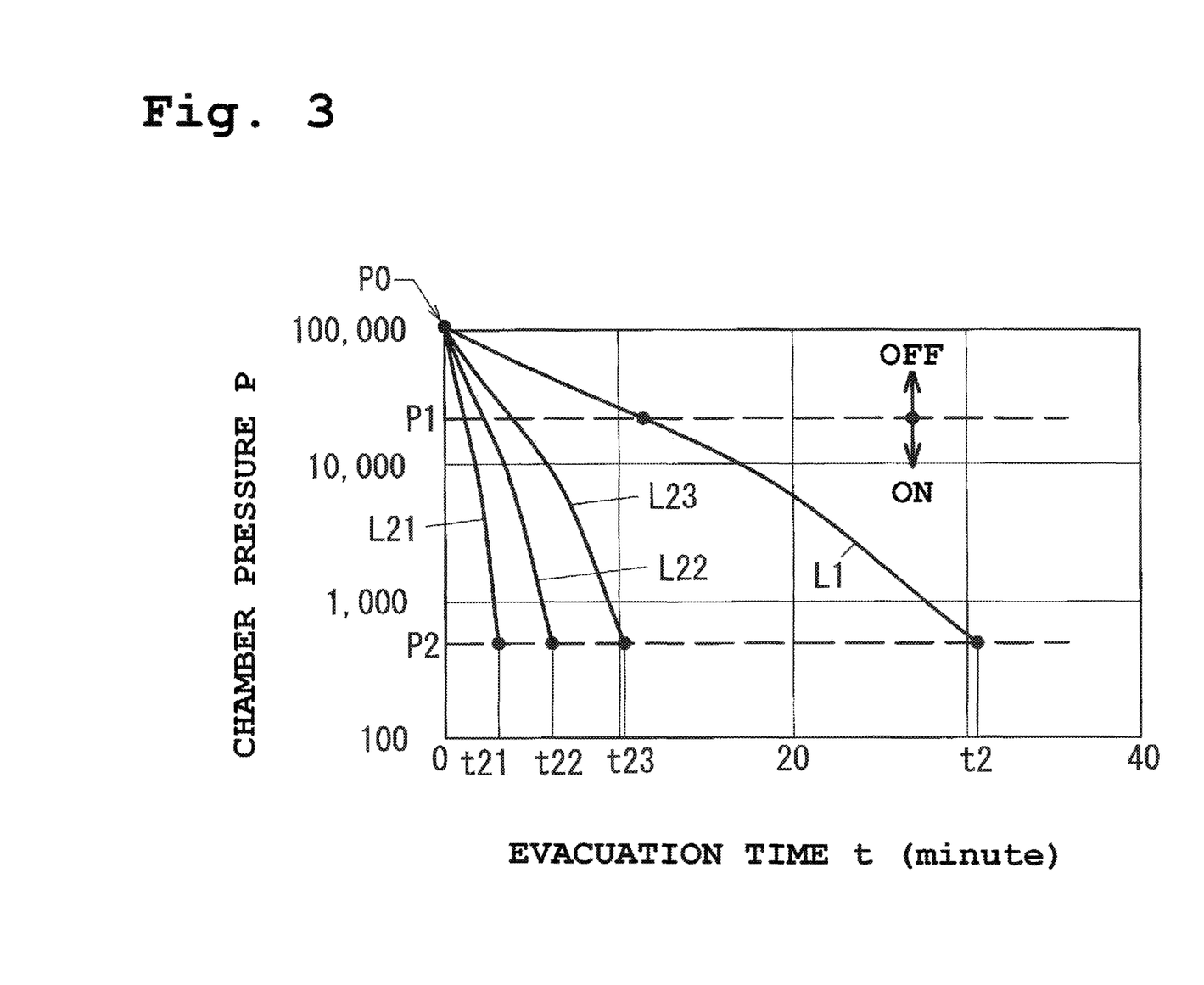
FIG. 3 is a graph showing a pressure versus time curve in the case of different chamber volumes.

As shown in Expression (3), the time t2 at which the suction-port-side pressure P reaches the startable pressure P2 depends on the chamber volume V and the pumping speed S of the backing pump 20. FIG. 3 shows pressure versus time curves for four types of vacuum chambers 100. Curves L21, L22, L23 show pressure versus time curves in cases where the volume of the vacuum chamber 100 is 100 (L), 200 (L), and 342 (L). Points of time at which pressures indicated by the curves L21, L22, L23 reach the startable pressure P2 are t21, t22, and t23.

As described above, the time at which the startable pressure P2 is brought varies when the volume of the vacuum chamber 100 varies. Thus, in the case of a method in which the time t2 is estimated based on the chamber volume V and the pumping speed S as in Patent Literature 1, the chamber volume V corresponding to the vacuum chamber 100 needs to be calculated and stored every time the connected vacuum chamber 100 is changed. Note that the chamber volume V includes the volume of the vacuum chamber 100 and the volume of the evacuation path between the vacuum chamber 100 and the backing pump 20 (i.e., the volume of the turbo-molecular pump 10 and the volume of a pipe).

When Expression (2) is applied to Expression (3), the elapsed time t2 until the suction-port-side pressure P reaches the startable pressure P2 after the start of the backing pump 20 is expressed as in Expression (4) below. Expression (4) does not depend on the chamber volume V and the pumping speed S of the backing pump 20, and therefore, can be applied to various vacuum chambers 100 with different volumes. In the present embodiment, the elapsed time t1 is acquired by measurement, and therefore, the elapsed time t2 can be estimated even when the chamber volume V and the pumping speed S of the backing pump 20 are unknown.

$$t2 = K \times t1 \qquad (4)$$

where $K = \log_e(P0/P2)/\log_e(P0/P1)$.

The atmospheric pressure P0 included in a constant K is an actual pressure in environment where the vacuum pumping device 1 is placed, and the storage section 42 of FIG. 1 stores the constant K based on the standard atmospheric pressure P0 (e.g., 100,000 Pa) and the startable pressure P2 of the mounted turbo-molecular pump 10. Moreover, the time t1 is the elapsed time until the pressure switch 30 is turned on after the start of the backing pump 20, and the timing of outputting the ON signal from the pressure switch 30 can be acquired by the time measurement section 413. That is, the acquired elapsed time t1 may be substituted into Expression (4), and in this manner, the elapsed time t2 may be calculated. At such a point that the time t2 has elapsed after the start of the backing pump 20, the turbo-molecular pump 10 may be started.

It is necessary that the pressure switch 30 or a vacuum gauge used instead of the pressure switch 30 can measure at least a pressure range from the atmospheric pressure P0 to the predetermined pressure P1. For utilizing a less expensive vacuum gauge, a low-vacuum gauge which can measure a range of the atmospheric pressure to about 500 Pa is preferably used. A pressure switch configured to detect a pressure difference can be obtained at a lower cost than the low-vacuum gauge.

(Method for Setting Predetermined Pressure P1)

In the case of using the pressure switch 30, the absolute value |P−P0| as the magnitude of the difference between the atmospheric pressure P0 and the suction-port-side pressure P needs to be equal to or less than the set pressure difference magnitude |P1−P0|. However, the atmospheric pressure P0 changes according to installation environment of the vacuum pumping device 1.

Figure 5:
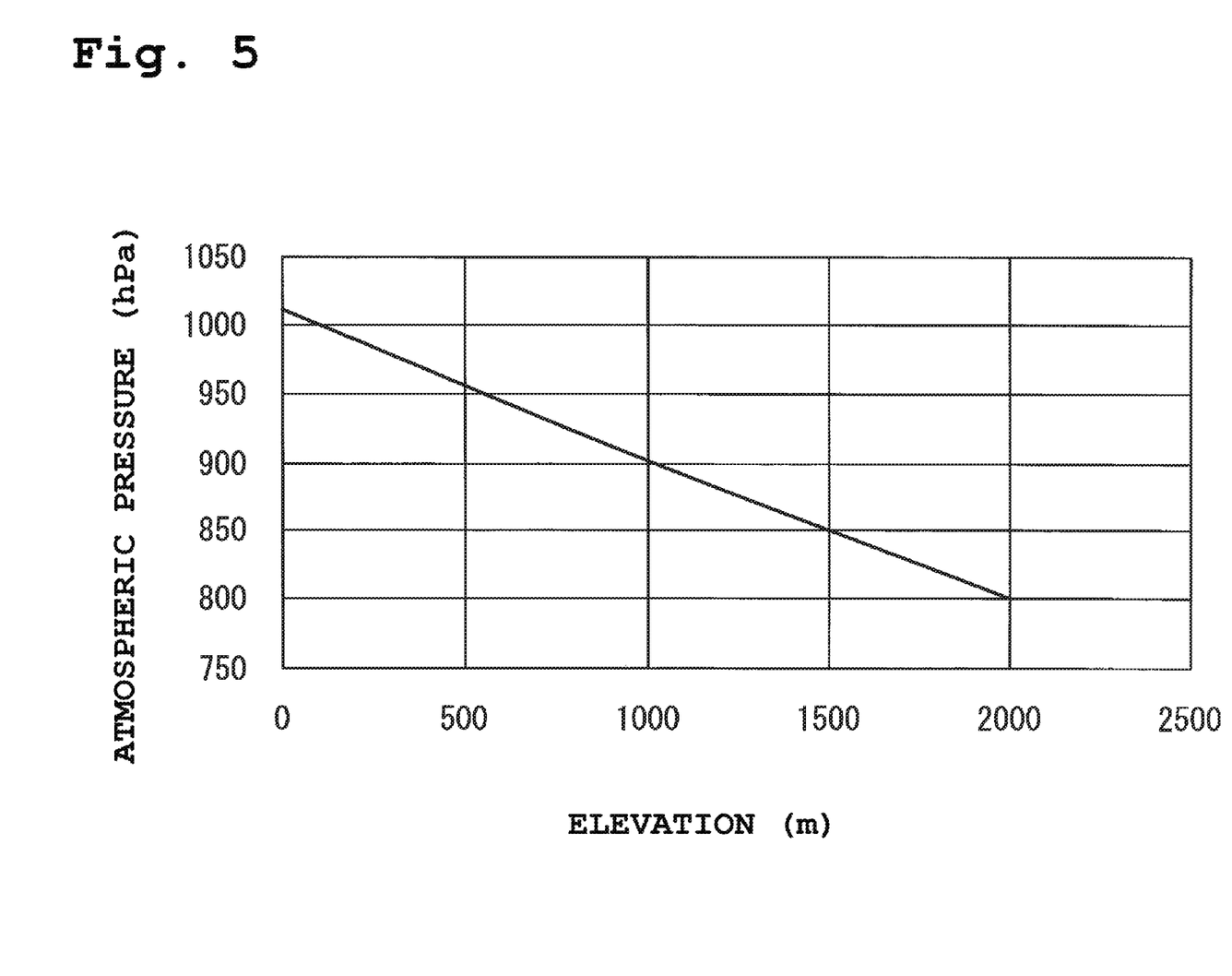
FIG. 5 is a graph showing a relationship between an elevation and an air pressure.

For example, even when the atmospheric pressure P0 at 0 m elevation is 101,325 Pa as in a relationship between an elevation and an air pressure as shown in FIG. 5, the value of the atmospheric pressure P0 changes according to the elevation. According to FIG. 5, the atmospheric pressure P0 at 2000 m elevation is 80 kPa. Thus, when the set pressure difference magnitude |P1−P0| is numerically set to less than 80 kPa, the ON signal can be output from the pressure switch 30 by pumping of the auxiliary pump 20.

For example, in a case where the set pressure difference magnitude |P1−P0| is set to 75 kPa, the ON signal is output from the pressure switch 30 at such a point that the pressure difference magnitude |P−80 kPa| which was 0 Pa at the start of pumping reaches 75 kPa, i.e., such a point that the suction-port-side pressure P decreases to 5 kPa. On the other hand, in a case where the set pressure difference magnitude |P1−P0| is set to 85 kPa, even if pumping can be performed such that the suction-port-side pressure P (the absolute pressure) at |P−80 kPa| reaches P=0 Pa, the pressure difference (gauge pressure) magnitude |P−80 kPa| can only increase to 80 kPa. That is, in a case where the set pressure difference has been set to −85 kPa, even when vacuum pumping by the backing pump 20 is performed for long time, no ON signal is output from the pressure switch 30, and the operator needs to manually start the turbo-molecular pump 10.

That is, for using the vacuum pumping device 1 even at 2000 m elevation, the set pressure difference magnitude needs to be set to less than 80 kPa. With such a set pressure difference, the vacuum pumping device 1 can be used in various types of atmospheric pressure environment at equal to or lower than 2000 m elevation. In a case where the set pressure difference magnitude is set to less than 80 kPa, if the elevation is about 100 m, even the case of a low air pressure due to an approaching meteorogical depression or typhoon can be satisfactorily handled.

Note that the above-described set pressure difference setting method is one example, and the set pressure difference can have a certain range. For example, in a case where an attempt is made to expand a device-usable elevation to about 2500 m, the set pressure difference may be −75 kPa. Conversely, in a case where an attempt is made to limit the device-usable elevation to about 600 m, the set pressure difference may be set to −95 kPa. Further, the set pressure difference is set to −75 kPa to −95 kPa so that sufficiently-long elapsed time t1 can be set with no measurement error problem. Note that calculation is made assuming that the atmospheric pressure linearly changes from 101,325 Pa at 0 m elevation to 80 kPa at 2000 m elevation in association with an elevation change and the air pressure decreases by 10.66 Pa when the elevation increases by 1 m.

In preparation for a case where the pressure switch 30 is not properly operated under preset set pressure conditions in an extreme atmospheric pressure environment situation, it may be configured such that a user can operate the input operation section 50 to change the set pressure difference. Such a user's set pressure difference is stored in the storage section 42, and is used instead of the set pressure difference stored in advance.

Note that a table of FIG. 5 may be stored, the elevation at which the vacuum pumping device 1 is to be used may be input by a worker, and the atmospheric pressure P0 may be calculated using such an elevation with reference to the table. Alternatively, an altimeter may be mounted on the vacuum pumping device 1, and using elevation data from the altimeter, the atmospheric pressure P0 may be calculated with reference to the table.

(Start Operation)

Figure 4:
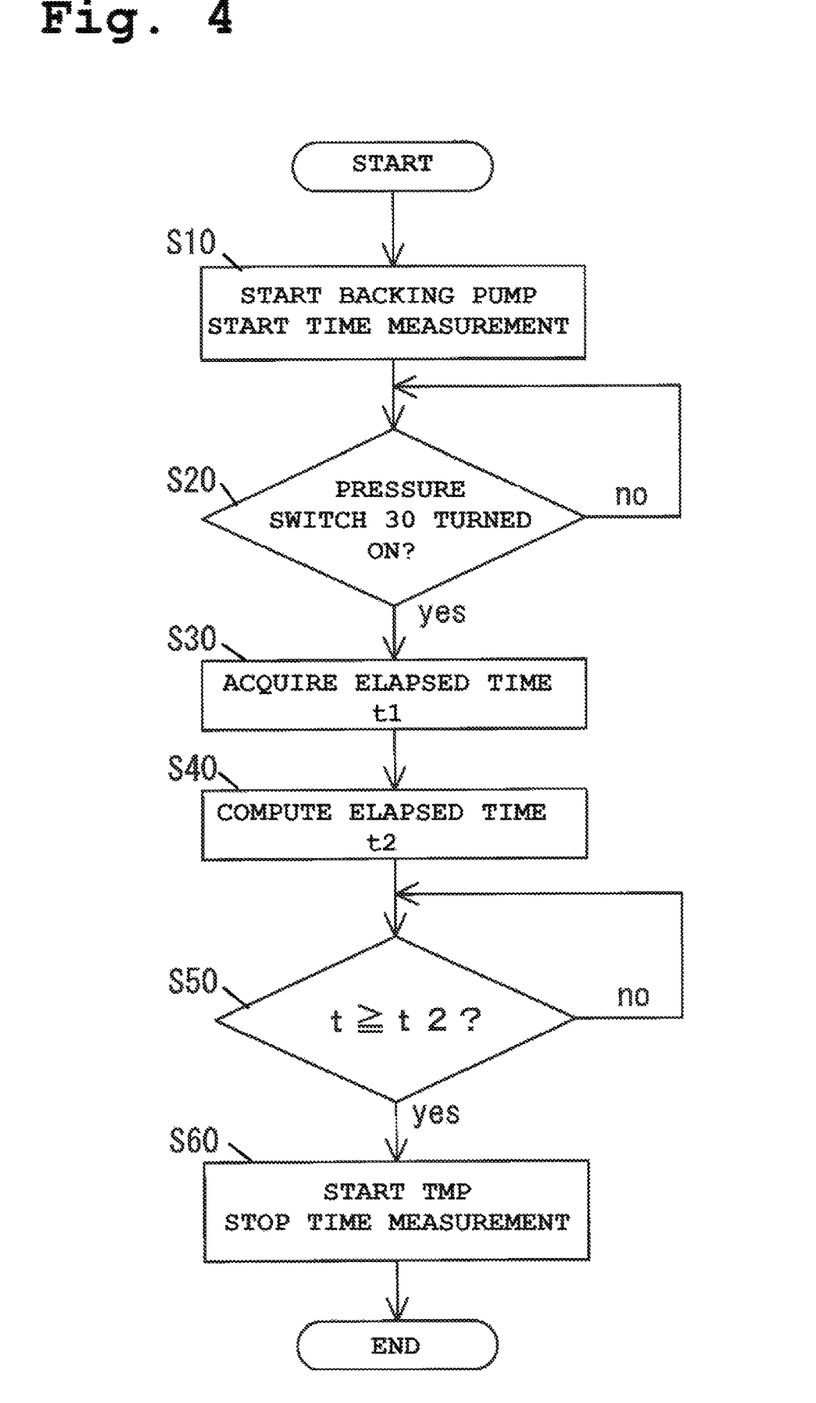
FIG. 4 is a flowchart showing one example of start processing.

FIG. 4 is a flowchart showing one example of start processing executed by the start control section 412. Such processing is started when the start switch provided at the input operation section 50 to start vacuum pumping is turned on. At a step S10, the backing pump 20 is started, and time measurement by the time measurement section 413 is started. At a step S20, it is determined whether or not the signal output from the pressure switch 30 is the ON signal, i.e., whether or not the detected pressure difference "−|P−P0|" has reached the set pressure difference "−|P1−P0|." When it is determined as the ON signal, the processing proceeds to a step S30. In a case where the pressure difference does not reach the set pressure difference, the processing of the step S20 is repeatedly executed, and when the pressure difference reaches the set pressure difference, the processing proceeds to the step S30. Note that the set pressure difference setting method will be described later.

At the step S30, time measured by the time measurement section 413 as time until the pressure difference reaches the set pressure difference, i.e., time until the pressure switch 30 is turned on after the backing pump 20 has been started, is acquired as the elapsed time t1. At a step S40, based on the acquired elapsed time t1 and Expression (4), the elapsed time t2 until the suction-port-side pressure P reaches the startable pressure P2 of the turbo-molecular pump 10 after the start of the backing pump, i.e., the elapsed time t2 until the start of the turbo-molecular pump 10 after the start of the backing pump, is estimated and computed.

At a step S50, it is determined whether or not the time measured by the time measurement section 413 as the elapsed time after the start of the backing pump 20 has reached the elapsed time t2 estimated and computed at the step S40. When t=t2, the processing proceeds to a step S60. At the step S60, the turbo-molecular pump 10 is started, and time measurement by the time measurement section 413 is stopped.

As described above, in the present embodiment, the time until the pressure switch 30 is turned on after the auxiliary pump 20 has been started is measured, and based on such a measurement value, the elapsed time t2 until the suction-port-side pressure P reaches the startable pressure P2 of the turbo-molecular pump 10 is calculated. Thus, it is not necessary to store the chamber volume V in the storage section 42 in advance as in the starting method described in Patent Literature 1, and the process of storing and setting the chamber volume V every time the vacuum pumping device 1 is attached to a different vacuum chamber 100 can be omitted.

(Variations)

In the above-described embodiment, the elapsed time t2 is estimated and computed utilizing the ON/OFF signal of the pressure switch 30. However, some pressure switches output analog output (voltage) corresponding to the pressure difference, and time measured when such an analog output value reaches a value corresponding to the set pressure difference may be acquired as the elapsed time t1. Alternatively, a low-vacuum gauge which can measure an operating pressure range of the auxiliary pump 20 may measure the pressure to acquire the elapsed time t1.

Figure 6:
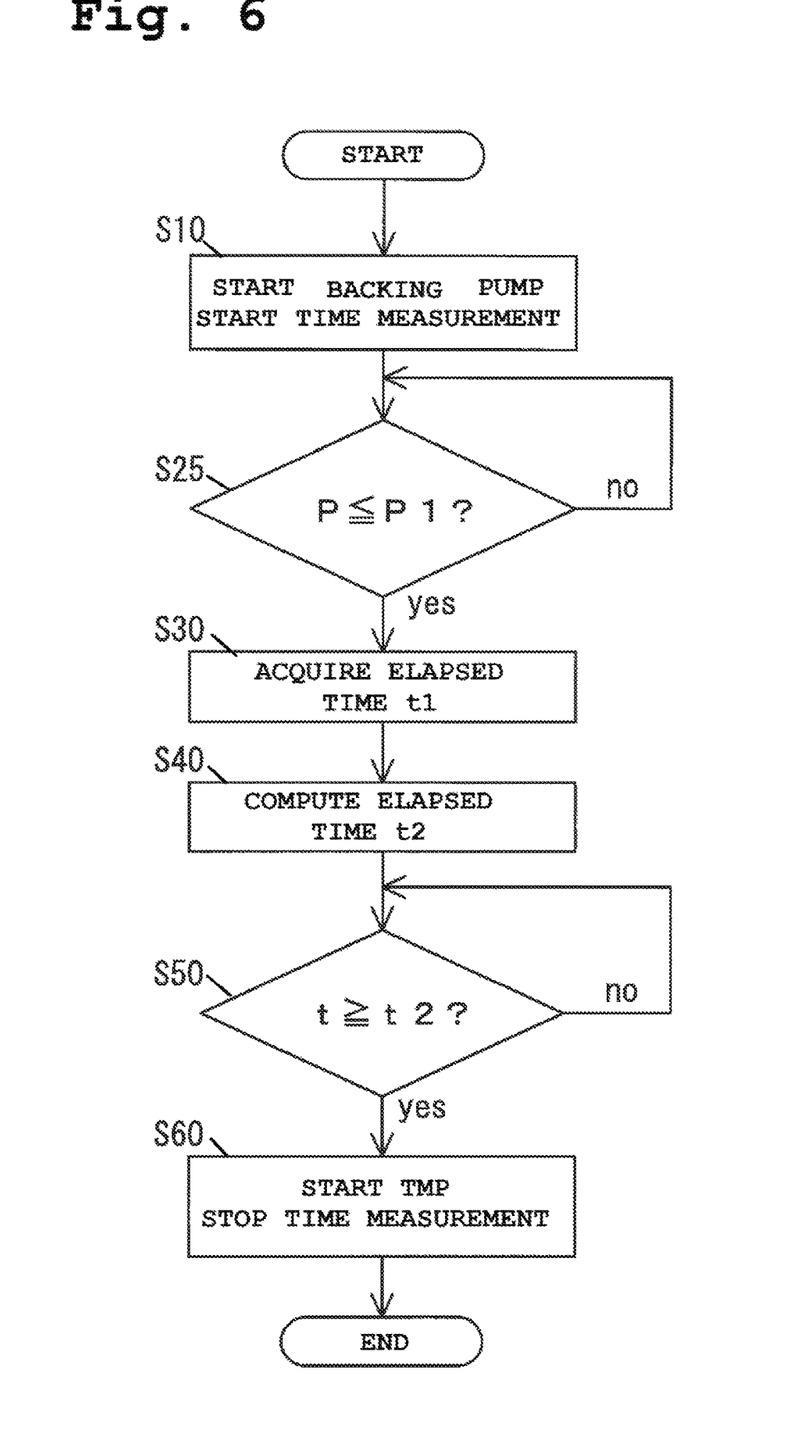
FIG. 6 is a flowchart showing one example of start operation in the case of acquiring elapsed time t1 by pressure measurement.

FIG. 6 is a flowchart showing one example of the start operation in the case of measuring the suction-port-side pressure to acquire the elapsed time t1. In the flowchart of FIG. 6, the processing of the step S20 of the flowchart of FIG. 4 is changed to processing as shown at a step S25. That is, it is determined whether or not the suction-port-side pressure P after the backing pump 20 has been started at the step S10 has reached the predetermined pressure P1 shown in FIG. 2. When P=P1 is satisfied, the processing proceeds to the step S30, and the time measured by the time measurement section 413 is acquired as the elapsed time t1. The processing from the step S40 to the step S60 is similar to that in the case of FIG. 4 as described above, and therefore, description thereof will be omitted. Note that even the case of acquiring the elapsed time t1 by means of the analog output (the voltage) of the pressure switch 30 is similar to the processing in the case of FIG. 6, except that not the absolute pressure but the pressure difference is used.

As described above, ON/OFF operation of the pressure switch 30 in the start operation shown in FIG. 4 is based on the gauge pressure as the difference between the suction-port-side pressure P and the atmospheric pressure P0. Thus, the set pressure difference (P1−P0) needs to be set considering the installation environment of the vacuum pumping device 1.

On the other hand, in the case of using the absolute pressure measured by the vacuum gauge as the suction-port-side pressure P instead of a pressure difference signal of the pressure switch 30 as in the start operation shown in FIG. 6, it is, as in the step S25, determined whether or not the suction-port-side pressure P has reached the predetermined pressure P1, and in this manner, the elapsed time t1 is acquired. Thus, in setting of the predetermined pressure P1, the above-described problem regarding setting of the pressure difference in the case of using the pressure switch 30 is not caused. Note that the vacuum gauge configured to measure the absolute pressure, such as a Pirani vacuum gauge, is generally more expensive than the pressure switch 30, and for this reason, there are disadvantages such as a cost increase.

Those skilled in the art understand that the above-described exemplary embodiment is a specific example of the following aspects.

[1] A vacuum pumping device comprises: a turbo-molecular pump; an backing pump connected to an outlet side of the turbo-molecular pump; a measurement section configured to measure first elapsed time until a suction-port-side pressure of the backing pump reaches a predetermined pressure higher than a turbo-molecular pump startable pressure and lower than an atmospheric pressure after start of the backing pump; an arithmetic section configured to calculate, based on the first elapsed time measured by the measurement section, the atmospheric pressure, and the predetermined pressure, second elapsed time until the suction-port-side pressure reaches the turbo-molecular pump startable pressure after the start of the backing pump; and a start control section configured to start the turbo-molecular pump when the second elapsed time has elapsed after the start of the backing pump.

That is, based on the first elapsed time t1 measured by the pressure switch 30 and the time measurement section 413 of FIG. 1 as a measurement section, the second elapsed time t2 until the suction-port-side pressure of the backing pump 20 reaches the startable pressure P2 of the turbo-molecular pump 10 after the start of the backing pump 20 is calculated. The turbo-molecular pump 10 is started at such timing that the second time t2 has elapsed after the start of the backing pump 20. Thus, no chamber volume data is necessary for calculation of the elapsed time t2. Consequently, the process of checking and storing the chamber volume every time a connected vacuum chamber is changed is not necessary, and the vacuum pumping device 1 of which start operation is facilitated and which has excellent operability can be provided.

[2] The measurement section includes a pressure gauge configured to measure the suction-port-side pressure of the backing pump or a pressure difference gauge configured to measure a pressure difference between the suction-port-side pressure and the atmospheric pressure, and a time measurement section configured to measure, as the first elapsed time, time until the measurement pressure of the pressure gauge reaches a predetermined pressure higher than the turbo-molecular pump startable pressure after the start of the backing pump or time until the measurement pressure difference of the pressure difference gauge reaches a pressure difference between the predetermined pressure and the atmospheric pressure after the start of the backing pump.

For example, it may be, as the measurement section configured to measure the first elapsed time t1, configured such that the elapsed time t1 until the pressure difference signal (the signal indicating the difference between the suction-port-side pressure and the atmospheric pressure) output from the pressure switch 30 reaches the pressure difference signal indicating the pressure difference=the predetermined pressure P1−the atmospheric pressure P0 is measured by the time measurement section 413 as in the pressure switch 30 and the time measurement section 413 shown in FIG. 1, or it may be configured such that the elapsed time t1 until the suction-port-side pressure measured by a pressure gauge reaches the predetermined pressure P1 higher than the startable pressure P2 of the turbo-molecular pump 10 is measured by the time measurement section 413.

[3] The measurement section includes a pressure switch configured to output a signal informing that a pressure difference between the suction-port-side pressure of the backing pump and the atmospheric pressure has reached a pressure difference between a predetermined pressure higher than the turbo-molecular pump startable pressure and the atmospheric pressure, and a time measurement section configured to measure, as the first elapsed time, time until the signal is outputted from the pressure switch after the start of the backing pump.

For example, it may be configured such that the pressure switch 30 and the time measurement section 413 are provided as the measurement section and time until an annunciation signal is output from the pressure switch 30 after the start of the backing pump 20, i.e., time until the pressure difference (P−P0) on the suction port side reaches the difference (P1−P0) between the predetermined pressure P1 and the atmospheric pressure P0 after the start of the backing pump is measured as the first elapsed time t1.

[4] A pressure difference between the predetermined pressure and the atmospheric pressure is set to a range of −75 kPa and −95 kPa. That is, in the configuration including the pressure switch 30 and the time measurement section 413 as the measurement section, the pressure difference (P1−P0) is set within a range of −75 kPa to −95 kPa so that sufficiently-long elapsed time t1 can be set with no measurement error problem and the use environment pressure of the vacuum pumping device 1 can have a range.

[5] When the first elapsed time is t1, the atmospheric pressure is P0, the predetermined pressure is P1, the turbo-molecular pump startable pressure is P2, and the second elapsed time is t2, t2 is calculated based on the following expression:

$$t2=\{\log_e(P0/P2)/\log_e(P0/P1)\} \times t1.$$

[6] A method for starting a vacuum pumping device including a turbo-molecular pump and a backing pump connected to an outlet side of the turbo-molecular pump, comprises: measuring first elapsed time until a suction-port-side pressure of the backing pump reaches a predetermined pressure higher than a turbo-molecular pump startable pressure and lower than an atmospheric pressure after start of the backing pump; calculating, based on the first elapsed time, the atmospheric pressure, and the predetermined pressure, second elapsed time until the suction-port-side pressure reaches the turbo-molecular pump startable pressure after the start of the backing pump; and starting the turbo-molecular pump when the second elapsed time has elapsed after the start of the backing pump.

That is, based on the measured first elapsed time t1, the atmospheric pressure P0, and the predetermined pressure P1 at which the pressure switch 30 is turned on, the second elapsed time t2 until the suction-port-side pressure reaches the startable pressure P2 of the turbo-molecular pump 10 after the start of the backing pump 20 is calculated according to Expression (4), and the turbo-molecular pump 10 is started based on the second elapsed time t2. Thus, no chamber volume data is necessary for calculation of the elapsed time t2. Consequently, the process of checking and storing the chamber volume every time the connected vacuum container is changed as in the typical case is not necessary.

Various embodiments and the variations have been described above, but the present invention is not limited to these contents. Other aspects conceivable within the scope of the technical idea of the present invention are also included in the scope of the present invention.

What is claimed is:

1. A vacuum pumping device comprising:
a turbo-molecular pump;
an backing pump connected to an outlet side of the turbo-molecular pump;
a measurement section configured to measure a first elapsed time until a suction-port-side pressure of the backing pump reaches a predetermined pressure higher than a turbo-molecular pump startable pressure and lower than an atmospheric pressure after a start of the backing pump;
an arithmetic section configured to calculate, based on the first elapsed time measured by the measurement section, the atmospheric pressure, and the predetermined pressure, a second elapsed time until the suction-port-side pressure reaches the turbo-molecular pump startable pressure after the start of the backing pump; and
a start control section configured to start the turbo-molecular pump when the second elapsed time has elapsed after the start of the backing pump.

2. The vacuum pumping device according to claim 1, wherein
the measurement section includes
a pressure gauge configured to measure the suction-port-side pressure of the backing pump or a pressure difference gauge configured to measure a pressure difference between the suction-port-side pressure and the atmospheric pressure, and
a time measurement section configured to measure, as the first elapsed time, time until a measurement pressure of the pressure gauge reaches the predetermined pressure higher than the turbo-molecular pump startable pressure after the start of the backing pump or time until a measurement pressure difference of the pressure difference gauge reaches a pressure difference between the predetermined pressure and the atmospheric pressure after the start of the backing pump.

3. The vacuum pumping device according to claim 1, wherein
the measurement section includes
a pressure switch configured to output a signal informing that a pressure difference between the suction-port-side pressure of the backing pump and the atmospheric pressure has reached a pressure difference between the predetermined pressure higher than the turbo-molecular pump startable pressure and the atmospheric pressure, and
a time measurement section configured to measure, as the first elapsed time, time until the signal is outputted from the pressure switch after the start of the backing pump.

4. The vacuum pumping device according to claim 2, wherein
a pressure difference between the predetermined pressure and the atmospheric pressure is set to a range of −75 kPa and −95 kPa.

5. The vacuum pumping device according to claim 1, wherein
when the first elapsed time is t1, the atmospheric pressure is P0, the predetermined pressure is P1, the turbo-molecular pump startable pressure is P2, and the second elapsed time is t2, t2 is calculated based on the following expression:

$$t2=\{\log_e(P0/P2)/\log_e(P0/P1)\} \times t1.$$

6. The vacuum pumping device according to claim 3, wherein
the pressure difference between the predetermined pressure and the atmospheric pressure is set to a range of −75 kPa and −95 kPa.

7. A method for starting a vacuum pumping device including a turbo-molecular pump and a backing pump connected to an outlet side of the turbo-molecular pump, comprising:
measuring a first elapsed time until a suction-port-side pressure of the backing pump reaches a predetermined pressure higher than a turbo-molecular pump startable pressure and lower than an atmospheric pressure after a start of the backing pump;
calculating, based on the first elapsed time, the atmospheric pressure, and the predetermined pressure, a second elapsed time until the suction-port-side pressure reaches the turbo-molecular pump startable pressure after the start of the backing pump; and
starting the turbo-molecular pump when the second elapsed time has elapsed after the start of the backing pump.

* * * * *